(12) United States Patent
Herrmann et al.

(10) Patent No.: US 7,781,544 B2
(45) Date of Patent: Aug. 24, 2010

(54) APPARATUS FOR THE GAS-PHASE POLYMERIZATION OF OLEFINS, IN PARTICULAR ETHYLENE

(75) Inventors: Eberhard Herrmann, Frankental (DE); Axel Sperber, Ludwigshafen (DE); Manfred Hecker, Neustadt Wied (DE); Rainer Karer, Kaiserlautern (DE); Klaus Berhalter, Bornheim Dersdorf (DE); Paulus De Lange, Wesseling (DE); Jörg Halpap, Bockelwitz (DE); Cyrus Ahmadzade-Youssefi, Köln (DE)

(73) Assignee: Basell Polyolefine GmbH, Wesseling (DE)

(*) Notice: Subject to any disclaimer, the term of this patent is extended or adjusted under 35 U.S.C. 154(b) by 574 days.

(21) Appl. No.: 11/667,349
(22) PCT Filed: Nov. 9, 2005
(86) PCT No.: PCT/EP2005/011956
§ 371 (c)(1),
(2), (4) Date: May 8, 2007
(87) PCT Pub. No.: WO2006/050919
PCT Pub. Date: May 18, 2006

(65) Prior Publication Data
US 2007/0264171 A1 Nov. 15, 2007

Related U.S. Application Data

(60) Provisional application No. 60/633,330, filed on Dec. 3, 2004.

(30) Foreign Application Priority Data
Nov. 11, 2004 (DE) ........................ 10 2004 054 628

(51) Int. Cl.
*C08F 2/00* (2006.01)
*F27B 15/08* (2006.01)
(52) U.S. Cl. .............................. 526/62; 526/65; 526/68; 526/88; 422/131; 422/147; 95/271; 55/467; 55/459.1
(58) Field of Classification Search ................ 422/147, 422/131; 95/271; 55/459.1, 467; 96/376; 528/483; 526/62, 65, 68, 88
See application file for complete search history.

(56) References Cited

U.S. PATENT DOCUMENTS 4,316,729 A * 2/1982 Mac Lean et al. .......... 55/459.1

(Continued)

FOREIGN PATENT DOCUMENTS

DE 3930765 2/1991

(Continued)

OTHER PUBLICATIONS

Ullmann's Encyclopedia of Industrial Chemistry, "Dust Separation—Filters;" E. Schmidt, F. Löffler; 6th Edition (2000).

(Continued)

*Primary Examiner*—N. Bhat
(74) *Attorney, Agent, or Firm*—William R. Reid

(57) ABSTRACT

An apparatus for the polymerization of olefins, in particular ethylene, comprising a gas-phase fluidized-bed reactor (1), a recycle gas line (2) connected to the reactor for discharging and recirculating the recycle gas stream comprising the unpolymerized olefin and a cyclone (3) located in the recycle gas line for the reduction and precipitation of the solid particles entrained in the recycle gas from the reactor, with the cyclone comprising an upper section (3a) which has an essentially vertical central axis, whose wall extends along a rotationally symmetric body and which is provided with a cyclone inlet (4) arranged eccentrically relative to the central axis, a middle section (3b) which adjoins the upper section (3a) and whose wall extends along a rotationally symmetric body which tapers in a downward direction, a lower section (3c) for discharging the solid particles precipitated from the recycle gas which adjoins the middle section (3b) and whose wall extends along a rotationally symmetric body and a tube (5) extending essentially axially symmetrically down into the upper section and, if appropriate, the middle section for discharging the recycle gas which has been freed of the particles. According to the invention the ratio $H_i$ of the distance $h_i$ from the lower end of the tube (5) extending downward into the cyclone to the intersection (6) of an imaginary extension of the wall of the downward-extending tube (5) with the wall of the middle section (3b) to the diameter $d_i$ of the downward-extending tube (5) is from 3 to 8, in particular from 4 to 7.

12 Claims, 1 Drawing Sheet

U.S. PATENT DOCUMENTS

| | | | |
|---|---|---|---|
| 4,486,207 A | | 12/1984 | Baillie |
| 4,740,550 A | | 4/1988 | Foster |
| 5,771,844 A | * | 6/1998 | Dietz .................... 122/4 D |
| 6,174,969 B1 | | 1/2001 | Kersting et al. |
| 6,391,153 B1 | * | 5/2002 | Wikdahl .................... 162/55 |
| 6,649,709 B1 | | 11/2003 | Bauer et al. |
| 6,830,735 B1 | * | 12/2004 | Bouma et al. ............... 422/171 |
| 6,849,699 B2 | | 2/2005 | Bauer et al. |
| 6,936,666 B2 | * | 8/2005 | Mihan et al. .................. 526/68 |
| 7,323,038 B2 | * | 1/2008 | Reiling ........................ 95/271 |
| 7,329,309 B2 | * | 2/2008 | Smith et al. .................... 95/271 |
| 2004/0236040 A1 | | 11/2004 | Mihan et al. |
| 2005/0126394 A1 | | 6/2005 | Reiling |

FOREIGN PATENT DOCUMENTS

| | | |
|---|---|---|
| EP | 089691 | 9/1983 |
| EP | 301872 | 2/1989 |
| EP | 475603 | 3/1992 |
| EP | 571826 | 12/1993 |
| EP | 972572 | 1/2000 |
| WO | 99/29736 | 6/1999 |
| WO | 03/080252 | 10/2003 |
| WO | 2006/050907 | 5/2006 Kunii et al., |

OTHER PUBLICATIONS

"Cyclones," *Fluidization Engineering*, Butterworth-Heinemann, p. 391-392 (1991).

M. Stieβ, *Mechanische Verfahrens-technik 2*, Springer-Verlag, p. 8-17 (1994).

* cited by examiner

APPARATUS FOR THE GAS-PHASE POLYMERIZATION OF OLEFINS, IN PARTICULAR ETHYLENE

This application is the U.S. national phase of International Application PCT/EP2005/011956, filed Nov. 9, 2005, claiming priority to German Patent Application 102004054628.2 filed Nov. 11, 2004, and the benefit under 35 U.S.C. 119(e) of U.S. Provisional Application No. 60/633,330, filed Dec. 3, 2004; the disclosures of International Application PCT/EP2005/011956, German Patent Application 102004054628.2 and U.S. Provisional Application No. 60/633,330, each as filed, are incorporated herein by reference.

The invention relates to an apparatus for the polymerization of olefins, in particular ethylene, comprising a gas-phase fluidized-bed reactor, a recycle gas line connected to the reactor for discharging and recirculating the recycle gas stream comprising the unpolymerized olefin and a cyclone located in the recycle gas line for the reduction and precipitation of the solid particles entrained in the recycle gas from the reactor, with the cyclone comprising an upper section which has an essentially vertical central axis, whose wall extends along a rotationally symmetric body and which is provided with a cyclone inlet arranged eccentrically relative to the central axis, a middle section which adjoins the upper section and whose wall extends along a rotationally symmetric body which tapers in a downward direction, a lower section for discharging the solid particles precipitated from the recycle gas which adjoins the middle section and whose wall extends along a rotationally symmetric body and a tube extending essentially axially symmetrically down into the upper section and, if appropriate, the middle section for discharging the particle-reduced recycle gas.

Gas-phase polymerization processes are economical processes for the polymerization of ethylene and propene or for the copolymerization of ethylene or propene with $C_2$-$C_8$-α-olefins. Such gas-phase polymerization processes can be configured either as gas-phase fluidized-bed processes or as stirred gas-phase processes. Processes of this type are described, for example, in EP-A-0 475 603, EP-A-0 089 691, EP-A-0 571 826 and WO 99/29736.

A characteristic of gas-phase fluidized-bed processes is that the bed comprising polymerizing polymer particles is kept in a fluidized state by introduction of a gas mixture from below. In addition, this gas mixture removes the heat of polymerization liberated from the reactor. The reaction gas is cooled in a heat exchanger located outside the reactor and is recirculated via a gas distributor plate back into the reactor (recycle gas).

However, a certain amount of finely divided polymer is carried from the reactor by the circulating recycle gas and is brought into the recycle gas system. These polymer particles contain active catalyst and can thus continue to polymerize in the recycle gas system. If these particles deposit in the recycle gas system, deposits and cake material can be formed at these points. These deposits themselves can firstly give rise to malfunctions (blockage of the cooler, conglutinations on the compressor), and secondly parts of these deposits can become detached again. This is undesirable for two reasons. The holes of the gas distributor plate of the reactor can quickly become blocked by the detached deposits and require a shutdown and costly cleaning. If such pieces of deposits get through the gas distributor plate into the reactor, the product quality is impaired by these particles which form specks. Particularly in the case of products for film applications, this can result in out-of-specification material being obtained.

The use of cyclones in olefin polymerization plants and their design is known in principle. However, it has hitherto been necessary either to connect a plurality of cyclones in series in order to ensure satisfactory removal of the fine particles or to accept introduction of fine dust into the recycle gas line and thus greater downtimes. On this subject, reference may be made, for example, to Kunii et al., Fluidization Engineering, Butterworth-Heinemann, 1991, pages 391-392, and Matthias Stieβ, Mechanische Verfahrenstechnik 2, Springer Verlag 1994, pages 8 to 17.

It was therefore an object of the invention to provide an apparatus of the type mentioned at the outset by means of which satisfactory removal of the fine dust from the recycle gas is ensured, even at high recycle gas velocities and a high fine dust content without the use of a cascade of cyclones, and at the same time the agglomeration of fine dust in the cyclone is avoided.

This object is achieved according to the invention by the ratio $H_i$ of the distance $h_i$ from the lower end of the tube extending downward into the cyclone to the intersection of an imaginary extension of the wall of the downward-extending tube with the wall of the middle section to the diameter $d_i$ of the downward-extending tube being from 3 to 8. The distance $h_i$ can also be considered to be the effective separating height of the cyclone.

Figure 1:
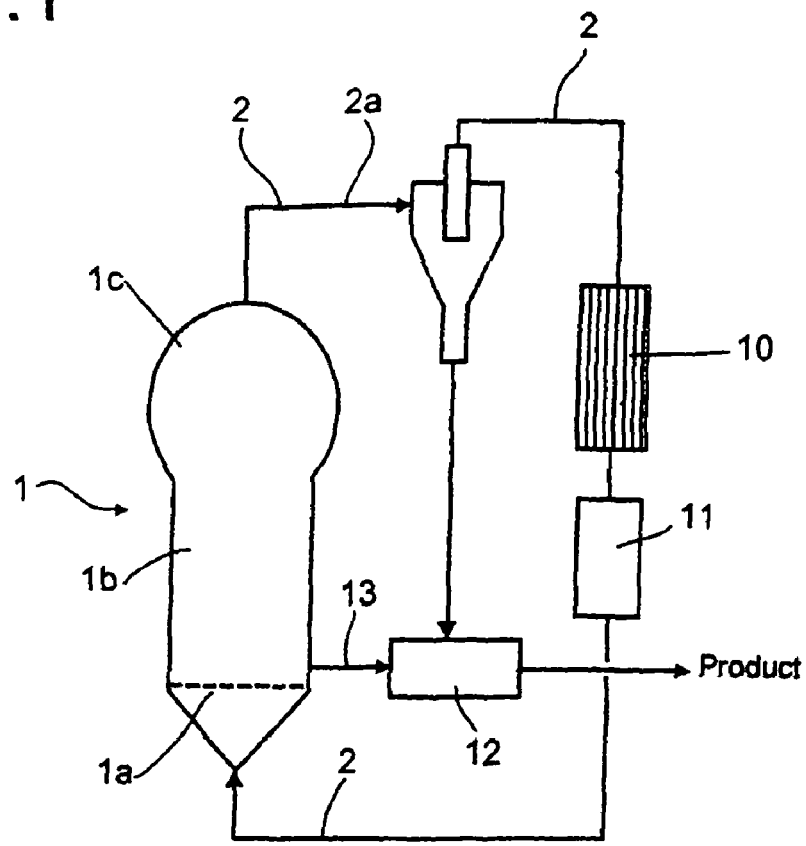
FIG. 1 shows a schematic diagram of a gas-phase fluidized-bed reactor.

The cyclone according to the invention accordingly comprises an upper section which has an essentially vertical central axis, whose wall extends along a rotationally symmetric body and which is provided with a cyclone inlet arranged eccentrically relative to the central axis, a middle section which adjoins the upper section and whose wall extends along a rotationally symmetric body which tapers in a downward direction, a lower section for discharging the solid particles precipitated from the recycle gas which adjoins the middle section and whose wall extends along a rotationally symmetric body and a tube extending essentially axially symmetrically down into the upper section and, if appropriate, the middle section for discharging the particle-reduced recycle gas, wherein the ratio $H_i$ of the distance $h_i$ from the lower end of the tube extending downward into the cyclone to the intersection of an imaginary extension of the wall of the downward-extending tube with the wall of the middle section to the diameter $d_i$ of the downward-extending tube is from 3 to 8, in particular from 4 to 7.

In this way, good separation of the fine particles from the recycle gas is achieved and at the same time agglomeration of the hot fine polymer particles is prevented.

Preference is given to using a ratio $H_i$ of from 4 to 7, particularly preferably from 4.5 to 6.5, in particular from 5 to 6.

In an advantageous embodiment of the present invention, the ratio of the height $h_l$ to the maximum diameter $d_l$ of the lower section is from 4 to 12, preferably from 5 to 11, particularly preferably from 6 to 10.

To achieve a further improvement in the precipitating action, the roughness of the interior walls of the upper section and of the middle section is preferably from 0.1 to 0.4 μm.

In an advantageous embodiment of the present invention, the upper section of the cyclone is essentially cylindrical. It is also advantageous for the lower section of the cyclone to be essentially cylindrical or have the shape of a truncated cone with a smaller inclination to the central axis than the middle section. The tube extending downward into the cyclone is preferably cylindrical. The inlet into the upper section of the cyclone can be configured as a slot inlet, a spiral inlet or an axial inlet. Preference is given to slot and spiral inlets through which the gas flows in tangentially. Further possible configurations and principles for the design of the cyclone may be found, for example, in Matthias Stieß, Mechanische Verfahrenstechnik 2, Springer Verlag 1994, pages 8 to 17.

The cyclone is, according to the invention, part of an apparatus for the polymerization of olefins in a gas-phase fluidized-bed reactor. In general, all types and operating modes of fluidized-bed reactors can be operated in conjunction with the cyclone configured according to the invention, as are described in detail in, for example, EP-A-0 475 603, EP-A-0 089 691, EP-A-0 571 826 and WO 99/29736. The gas-phase fluidized-bed reactor is generally a more or less long tube through which circulated reactor gas flows. In general, the circulated reactor gas is fed in at the lower end of the gas-phase fluidized-bed reactor and is taken off again at its upper end. When the reactor is employed for the polymerization of α-olefins, the circulated reactor gas is preferably a mixture of the respective α-olefin or the α-olefins and inert gases such as nitrogen and/or saturated hydrocarbons such as ethane, propane, butane, pentane or hexane, if desired together with a molecular weight regulator such as hydrogen. As mentioned at the outset, the velocity of the circulated reactor gas has to be sufficiently high to fluidize the mixed loose bed of finely divided polymer present in the tube and serving as polymerization zone and also to remove the heat of polymerization effectively.

To set constant reaction conditions, the constituents of the reactor gas can be fed into the gas-phase fluidized-bed reactor either directly or via the circulated reactor gas. In the process of the invention, it is advantageous to introduce the catalyst directly into the fluidized bed. In this case, it is found to be particularly advantageous to meter the catalyst a little at a time directly into the bed of loose material with the aid of nitrogen, argon or propane.

Gas-phase fluidized-bed reactors generally have a calming zone in the upper part of the reactor chamber. As a result of an enlargement of the reactor diameter in the upper part of the reactor chamber, the flow velocity of the fluidizing gas is reduced, as a result of which the polymer particles are no longer carried further upward. This calming zone therefore has the effect of reducing discharge of polymer particles from the reactor chamber. The calming zone is associated with a considerable capital cost. The apparatus of the present invention has made it possible to dispense with the calming zone because entrained polymer particles can be efficiently separated off in the cyclone. An advantageous embodiment of the process of the invention therefore provides for the reactor not to have a calming zone.

The present invention further provides a continuous gas-phase polymerization process for the preparation of olefin homopolymers and copolymers, in which the olefin or olefins is/are polymerized in the gas phase in a bed of finely divided polymer in the presence of a catalyst at pressures of from 0.1 to 15 MPa and temperatures of from 30 to 150° C. in the polymerization zone of a polymerization reactor, with the reactor gas being circulated to remove the heat of polymerization and the circulated reactor gas leaving the reactor firstly being conveyed through a cyclone which comprises:

an upper section which has an essentially vertical central axis, whose wall extends along a rotationally symmetric body and which is provided with a cyclone inlet arranged eccentrically relative to the central axis, a middle section which adjoins the upper section and whose wall extends along a rotationally symmetric body which tapers in a downward direction, a lower section for discharging the solid particles precipitated from the recycle gas which adjoins the middle section and whose wall extends along a rotationally symmetric body and a tube extending essentially axially symmetrically down into the upper section and, if appropriate, the middle section for discharging the recycle gas which has been freed of the particles, wherein the ratio $H_i$ of the distance $h_i$ from the lower end of the tube extending downward into the cyclone to the intersection of an imaginary extension of the wall of the downward-extending tube with the wall of the middle section to the diameter $d_i$ of the downward-extending tube is from 3 to 8, in particular from 4 to 7.

The olefins are preferably ethylene, propene or butene, optionally in the presence of further $C_2$-$C_8$-monomers. Particular preference is given to the polymerization of ethylene, if appropriate together with butene or hexene as comonomers.

Possible catalysts are all known catalysts as are customarily used for the (co)polymerization of ethylene and propene or butene, i.e., for example, Ziegler-Natta catalysts, chromium catalysts or single-site catalysts, in particular metallocene catalysts. These catalysts including necessary or advantageous cocatalysts and activators are known to those skilled in the art. It is also possible to use these catalysts together with metal alkyls, in particular aluminum alkyls, which serve as cocatalysts and/or as scavengers for impurities. In general, these catalysts are used in supported form, for example on support materials such as inorganic oxides (e.g. MgO or silica gel) or organic polymers (e.g. polyethylene particles). However, the catalysts can also be fed into the reactor in unsupported form.

In a further preferred variant of the present invention, a catalyst poison is metered into the recycle gas line between the gas-phase fluidized-bed reactor and the cyclone. The catalyst poison, which is present in the liquid phase, thus has the opportunity of wetting the highly catalytically active fine dust particles. The wetted fine dust particles are then removed from the recycle gas in the cyclone. This process step makes it possible to remove not only the fine dust but also the catalyst poison from the recycle gas or at least to reduce its concentration in the recycle gas significantly. This has the result that less catalyst poison gets into the reactor where it can have an adverse effect on the polymerization reaction. On the other hand, it is also possible to add relatively large amounts of the catalyst poison so that a more effective deactivation of the polymerization-active fine dust particles can be achieved. Fine dust which is not precipitated in the cyclone is also wetted with the catalyst poison, as a result of which undesirable polymerization and deposit formation in the recycle gas system is reduced further.

Preferred catalyst poisons are all compounds which have a boiling point above the maximum temperature within the recycle gas system. The catalyst poisons can have completely different chemical natures. It is important that, firstly, they have a low vapor pressure at the temperatures prevailing in the recycle gas system. Secondly, these catalyst poisons have to bear functional groups which coordinate more strongly than ethylene to the active sites of the catalyst metal atoms and thus inhibit the catalyst highly irreversibly. The first requirement, i.e. the low vapor pressure, depends first and foremost on the molecular weight, so that, for example, oligomers and polymeric materials having suitable functional groups display good effectiveness. Well-suited catalysts poisons for the purposes of the present invention generally have a molecular weight above 100, preferably above 150 and particularly preferably above 200.

Preference is given to using catalyst poisons which have a vapor pressure at 20° C. of less than 10 000 Pa, particularly preferably less than 2000 Pa and very particularly preferably less than 1000 Pa.

With regard to suitable functional groups, preference is given to a process in which a compound or a mixture of compounds which contain at least one of the functional groups —$NR_2$, —NR—, —OR, —O—, =O, —OS, —S— and =S, where R is hydrogen or an alkyl radical having from 1 to 8 carbon atoms, is introduced as catalyst poison. Compounds which bear a plurality of such functional groups are particularly useful; in this case, the functional groups can be identical or different.

Hydrogen is preferred as radical R, but alkyl radicals such as methyl, ethyl, propyl, isopropyl and butyl and also the various $C_5$-$C_8$-alkyl radicals are also suitable, with methyl and ethyl being preferred.

In the process of the invention, particular preference is given to using catalyst poisons which contain a hydroxyethylamino group, in particular catalyst poisons having a di(hydroxyethyl)amino group. Particular mention may be made, for example, of the commercially available alkylamino ethoxylate Atmer 163 (manufactured by, for example, Uniqema, marketed by Ciba Spezialitätenchemie Lambertheim GmbH, Germany).

The amount of catalyst poison to be added cannot be indicated in general terms, since it depends on the catalyst poison, on the catalyst or cocatalyst system, on the amount of fine dust formed and on the reaction conditions. It is necessary to determine the optimum amount experimentally. An advantageous procedure is to increase the amount of catalyst poison gradually until an influence on the catalyst productivity becomes detectable and then reduce the amount again to a small degree. Since the precise amount of fine dust to be deactivated is not known, it is possible, as an approximation, to introduce catalyst poison into the recycle gas line in an amount of about 0.1-10 ppm, preferably 0.5-3.0 ppm, particularly preferably 0.5-1.0 ppm, based on the product output.

The catalyst poison can be introduced into the recycle gas line in pure form or, preferably, in dilute form, most advantageously in dissolved form. A particularly effective method of addition is to spray the catalyst poison together with a diluent as a fine aerosol into the recycle gas line via a spray nozzle. Possible diluents are all media which are compatible with the polymerization process. A process in which the catalyst poison is fed into the recycle gas line as a mixture with a $C_3$-$C_8$-α-monoolefin, preferably in dissolved form, has been found to be particularly advantageous. Naturally, the respective comonomer is generally utilized in this case. It is likewise advantageous to introduce the catalyst poison in the form of a mixture or a solution in an inert hydrocarbon such as hexane. The concentration of the catalyst poison is then preferably from 0.1 to 1.0% by weight, based on the total amount of this mixture or this solution.

In a preferred embodiment of the process of the invention, the catalyst poison is fed into the recycle gas line together with a surface-active compound. As surface-active substances, it is possible to use, for example, fatty alcohol ethoxylates, polyalkylene glycols or ethylene oxide-propylene oxide block copolymers. Further suitable compounds are known to those skilled in the art. The surface-active substances increase the wettability of the fine dust by the catalyst poison liquid and thus improve the effectiveness of the catalyst poisons.

Other additives known to those skilled in the art can also be used in the polymerization process of the invention. The use of additives which reduce the electrostatic charging of the polymer particles in the reactor has been found to be particularly advantageous. It has been found to be particularly useful to employ an antistatic such as Costelan AS 100 (manufacturer: H. Costenoble GmbH & Co. KG, Germany).

In a further advantageous embodiment of the process of the invention, the fine dust precipitated in the cyclone is discharged from the cyclone via a pressure gradient prevailing between the cyclone and the depressurization vessel and is added to the product in the depressurization vessel. In this way, the fine dust which has been separated off is utilized in an economical way without an adverse effect on the polymer being observed. This embodiment makes it possible to discharge the fine dust which has been separated off by means of the cyclone from the cyclone via a pressure gradient as prevails between reactor and depressurization vessel. This usually considerable pressure gradient ensures effective emptying of the cyclone and additionally reduces deposit formation in the cyclone.

The invention is illustrated below with the aid of drawings, without the invention being restricted thereto.

FIG. 1 indicates the construction of a gas-phase fluidized-bed reactor. The actual reactor 1 comprises a cylindrical tube. The fluidized bed 1b is usually bounded at the bottom by a gas distributor plate 1a. The cylindrical section is adjoined at the top by a widening calming zone 1c which reduces the discharge of particles from the reactor. In an alternative embodiment, the calming zone can also be omitted because of the good separation action, particularly when a catalyst poison is additionally fed in upstream of the cyclone. The reaction gas leaves the reactor at the upper end of the calming zone and is conveyed in the recycle gas line 2 via the cyclone 3 to the heat exchanger 10 in which the recycle gas is cooled and from there via a compressor 11 back to the reactor. An addition line 2a which allows a catalyst poison to be introduced is provided in the recycle gas line 2 between the reactor 1 and the cyclone 3. The polymer is discharged continuously or discontinuously through a discharge line 13. The polymer is freed of the major part of the gas discharged with it in a depressurization vessel 12 and is passed to the further processing units.

Figure 2:
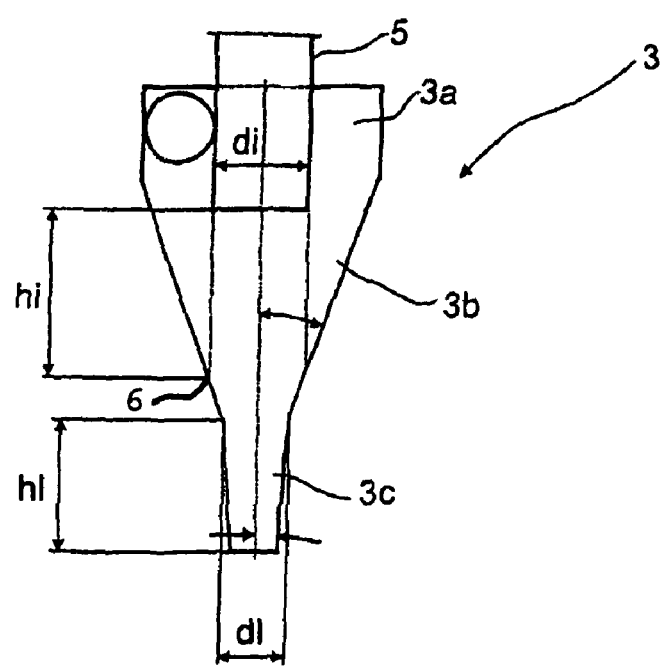
FIG. 2 shows a schematic diagram of an embodiment according to the invention of a cyclone.

FIG. 2 schematically shows a cyclone 3 having a cylindrical upper section 3a which has a vertical central axis. The wall of the upper section 3a extends along a rotationally symmetric body, preferably a cylinder, and is provided with a cyclone inlet 4 arranged eccentrically relative to the central axis, in the present case tangentially. The cyclone inlet 4 is connected to the part of the recycle gas line 2 which conveys the particle-laden recycle gas from the reactor to the cyclone 3 in the polymerization plant.

The upper section 3a of the cyclone 3 is adjoined by a middle section 3b whose wall extends along a truncated cone tapering in a downward direction. The upper diameter of the middle section 3b has the same diameter as the upper section 3a. The angle of inclination a of the wall to the central axis is preferably from 8° to 20°, particularly preferably from 10° to 15°.

The middle section 3b is in turn adjoined by a lower section 3c which serves to discharge the solid particles precipitated from the recycled gas. Its wall has the shape of a cylinder. As a likewise preferred alternative, the wall can also have the shape of a truncated cone tapering in a downward direction, with the angle of inclination to the central axis having to be smaller than the angle of inclination β of the wall of the middle section 3b to the central axis in order to ensure discharge of the particles from the cyclone. The angle of inclination β is preferably from 0° to 10°, particularly preferably from 2° to 7°. The lower diameter of the lower section 3c has to be such that blockage by the precipitated particles is ruled out.

The fine dust separated off by means of the cyclone is discharged from the cyclone 3 via a pressure gradient prevailing between the cyclone 3 and the depressurization vessel 12 and is added to the product in the depressurization vessel 12 (see FIG. 1).

In the interior of the upper section and part of the middle section, there is a vertical cylindrical tube 5 which extends downward into the cyclone and serves to discharge the particle-reduced recycle gas and is connected in the polymerization plant to the part of the recycle gas line which conveys the purified recycled gas back to the reactor after cooling. The ratio $H_i$ of the distance $h_i$ from the lower end of the tube 5 extending downward into the cyclone to the intersection 6 of an imaginary extension of the wall of the downward-extending tube 5 with the wall of the middle section 3b to the diameter $d_i$ of the downward-extending tube 5 $H_i=h_i/d_i$ is from 5 to 6. The ratio of the height $h_i$ to the maximum diameter $d_i$ of the lower section 3c is from 6 to 10 in the present case.

The invention claimed is:

1. An apparatus for the polymerization of olefins comprising a gas-phase fluidized-bed reactor (1), a recycle gas line (2) connected to the reactor for discharging and recirculating recycle gas comprising solid particles and unpolymerized olefins, and a cyclone (3) located in the recycle gas line for the reduction and precipitation of the solid particles entrained in the recycle gas from the reactor, with the cyclone comprising:
   an upper section (3a) comprising interior walls which has an essentially vertical central axis, whose wall extends along a rotationally symmetric body and which is provided with a cyclone inlet (4) arranged eccentrically relative to the central axis;
   a middle section (3b) comprising interior walls which adjoins the upper section (3a) and whose wall extends along a rotationally symmetric body which tapers in a downward direction;
   a lower section (3c) for discharging the solid particles precipitated from the recycle gas, which adjoins the middle section (3b) and whose wall extends along a rotationally symmetric body; and
   a tube (5) comprising a diameter $d_i$ extending essentially axially symmetrically down into the upper section (3a) and optionally the middle section (3b) for discharging the recycle gas which has been freed of the solid particles,
wherein a ratio $H_i$, equal to $h_i/d_i$, has a value from 4.5 to 6.5, $h_i$ being the distance from the lower end of the tube (5) extending downward into the cyclone to an intersection (6) of an imaginary extension of the wall of the downward-extending tube (5) with the wall of the middle section (3b), and $d_i$ being the diameter of the downward-extending tube (5).

2. The apparatus according to claim 1, further comprising a ratio of a height $h_1$ to a maximum diameter $d_1$ of the lower section (3c) of from 4 to 12.

3. The apparatus according to claim 1, further comprising a roughness of the interior walls of the upper section (3a) and of the middle section (3b) of from 0.1 to 0.4 μm.

4. The apparatus according to claim 1, wherein the upper section (3a) of the cyclone is essentially cylindrical.

5. The apparatus according to claim 1, wherein the lower section (3c) of the cyclone is essentially cylindrical or tapers conically in a downward direction with a smaller inclination to the central axis than the middle section (3b).

6. The apparatus according to claim 1, further comprising an addition line (2a) for the introduction of a catalyst poison in the recycle gas line (2) between the reactor (1) and the cyclone (3).

7. A continuous gas-phase polymerization process for the preparation of olefin homopolymers and copolymers in an apparatus comprising a gas-phase fluidized-bed reactor (1), a recycle gas line (2) connected to the reactor for discharging and recirculating recycle gas comprising solid particles and unpolymerized olefins, and a cyclone (3) located in the recycle gas line for the reduction and precipitation of the solid particles entrained in the recycle gas from the reactor, with the cyclone comprising:
   an upper section (3a) comprising interior walls which has an essentially vertical central axis, whose wall extends along a rotationally symmetric body and which is provided with a cyclone inlet (4) arranged eccentrically relative to the central axis;
   a middle section (3b) comprising interior walls which adjoins the upper section (3a) and whose wall extends along a rotationally symmetric body which tapers in a downward direction;
   a lower section (3c) for discharging solid particles precipitated from the recycle gas, which adjoins the middle section (3b) and whose wall extends along a rotationally symmetric body; and
   a tube (5) comprising a diameter $d_i$ extending essentially axially symmetrically down into the upper section (3a) and optionally the middle section (3b) for discharging the recycle gas which has been freed of the solid particles,
wherein a ratio $H_i$, equal to $h_i/d_i$, has a value of 4.5 to 6.5, $h_i$ being the distance from the lower end of the tube (5) extending downward into the cyclone to an intersection (6) of an imaginary extension of the wall of the downward-extending tube (5) with the wall of the middle section (3b), and $d_i$ being the diameter of the downward-extending tube (5), the process comprising polymerizing at least one olefin in the gas phase in a bed of finely divided polymer in the presence of a catalyst, at pressures of from 0.1 to 15 MPa and temperatures of from 30 to 150° C., in a polymerization zone of the fluidized bed reactor (1), with a reactor gas being circulated to remove the heat of polymerization, wherein circulated reactor gas leaving the reactor is first conveyed through a cyclone (3).

8. The process according to claim 7, further comprising that a catalyst poison is metered into the recycle gas line (2).

9. The process according to claim 8, wherein the catalyst poison has a boiling point which is above a maximum temperature of the recycle gas stream.

10. The process according to claim 7, wherein the olefin homopolymers and copolymers are discharged from the reactor (1) into a depressurization vessel (12) and the solid particles precipitated in the cyclone 3 are discharged from the cyclone (3) via a pressure gradient prevailing between the cyclone (3) and the depressurization vessel (12), and added to the in the depressurization vessel (12).

11. The apparatus of claim 1 wherein the olefins comprise ethylene.

12. The apparatus of claim 2 wherein the ratio of the height $h_i$ to the maximum diameter $d_1$ of the lower section (3c) is from 5 to 11.

* * * * *